Dec. 26, 1967  J. D. RUTZEBECK  3,360,023
WOODWORKING TOOL
Filed Sept. 27, 1965
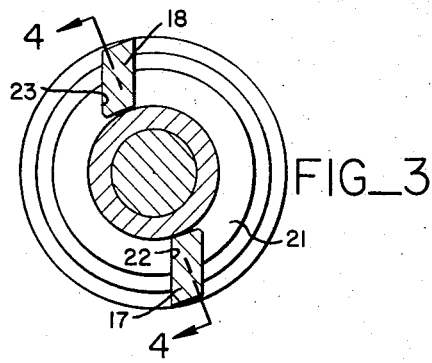
FIG_3
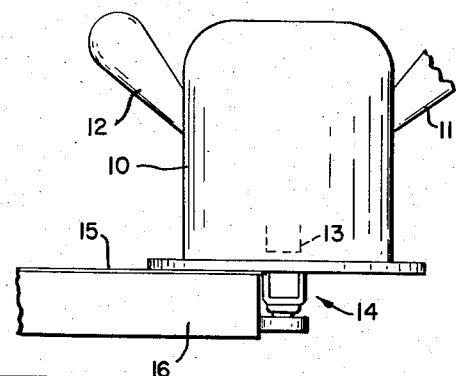
FIG_1
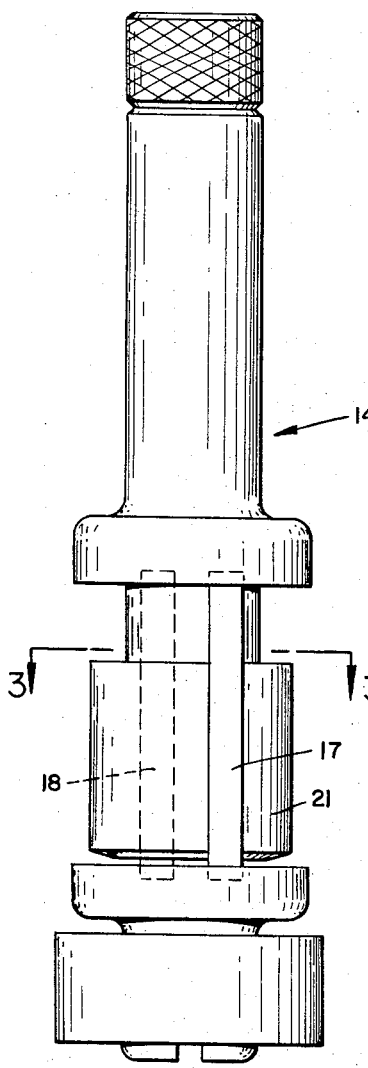
FIG_2
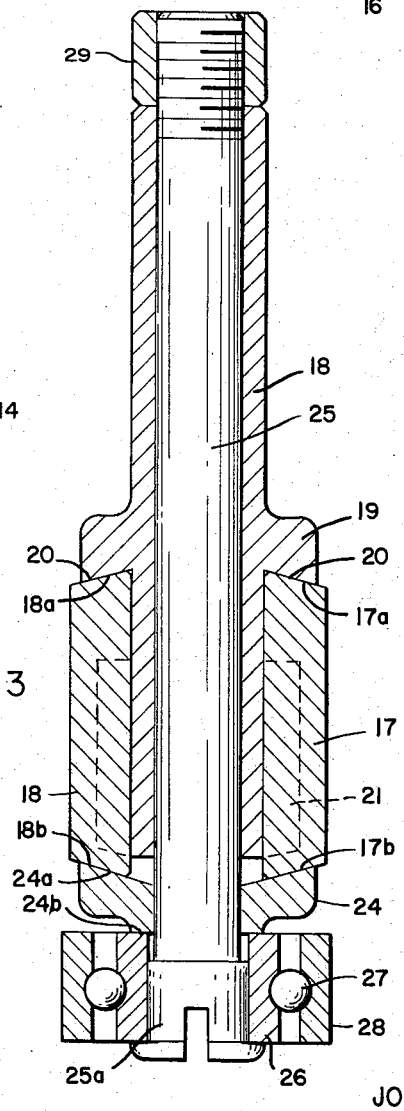
FIG_4
INVENTOR.
JOHN D. RUTZEBECK
BY Allen and Chromy
ATTORNEYS

United States Patent Office 3,360,023
Patented Dec. 26, 1967

3,360,023
WOODWORKING TOOL
John D. Rutzebeck, P.O. Box 30,
Hayward, Calif. 94543
Filed Sept. 27, 1965, Ser. No. 490,523
1 Claim. (Cl. 144—134)

ABSTRACT OF THE DISCLOSURE

A rotary cutting tool having a hollow body member, one end part of which forms a shank that is adapted to be gripped by the chuck of a hand-held driving unit and the other end part of which is provided with slots for receiving the cutting bits. The hollow member is provided with a flange, one side of which is undercut to engage one end of each of the cutting bits. The device is also provided with a washer, one side of which is undercut to engage the other ends of the cutting bits in clamping relation. A rod member is positioned in the hollow member and holds a work-engaging bearing thereon against the washer. The other end of the rod is threaded and projects from the shank end of the hollow member. A nut is provided to the threaded rod. The rod clamps the parts of the device and holds them assembled.

This invention relates to a rotary cutting tool having carbide type cutting bits for use in the woodworking industry.

An object of this invention is to provide an improved rotary tool in which carbide type cutting bits are held under compression during the use thereof.

Another object of this invention is to provide an improved rotary tool in which carbide type cutting bits are clamped in a holder between two oppositely disposed inclined surfaces thereof which are brought to bear against the ends of the carbide type bits by a bolt passing through the holder whereby the bits are held in the holder under compression.

Another object of this invention is to provide an improved carbide type cutting bit holder having a shank that is adapted to be gripped in a hand held motor driven device such as a router, said holder having a bolt passing through the shank thereof for clamping the bits between oppositely disposed cone surfaces by said bolt so that the bits are held in the holder under compression, the free end of the holder also being provided with a guide in the form of a rotatable bearing which is adapted to engage a guide surface during the use of the tool.

Still another object of this invention is to provide an improved carbide type bit holder for use in hand held routers, said holder being constructed so that the likelihood of the carbide type bits being thrown therefrom in case of fracture or breakage is minimized.

Other and further objects of this invention will be apparent to those skilled in the art to which it relates from the following specification, claim and drawing, in which, briefly:

FIG. 1 is a view showing this device attached to a hand held router and being used for trimming the edge of a plastic top applied to a plywood core;

FIG. 2 is a side view of the carbide bit holder of this invention;

FIG. 3 is a sectional view taken along the line 3—3 of FIG. 2; and

FIG. 4 is a sectional view taken along the line 4—4 of FIG. 3.

Referring to the drawing in detail, reference numeral 10 designates a hand held motor driven device, such as a router, which is provided with handles 11 and 12 and a chuck 13 for receiving and gripping the shank of the tool 14. It is, of course, obvious that this tool may be used in conjunction with other driving mechanisms if desired.

The tool 14 is provided with a hollow sleeve-like shank 18, the mid portion 19 of which is enlarged and provided with an undercut surface 20 which is adapted to engage the sloping surfaces 17a and 18a of carbide type cutting tips or cutting bits 17 and 18, respectively. The lower inclined surfaces 17b and 18b of these tips 17 and 18, respectively, engage the undercut upper surface of the clamping member 24.

The member 18 is provided with a lower part 21 which is of cylindrical shape having a diameter greater than the shank portion but somewhat less than the portion 19, as shown in FIGS. 2 and 3. This lower part is provided with grooves 22 and 23 for receiving the cutting tips 17 and 18, respectively.

The bolt 17 is positioned inside of the sleeve-like shank 18. The head 25a of this bolt is positioned in the inner race 26 of the ball bearing assembly, which includes the balls 27 positioned between the inner race 26 and the outer race 28. The bolt 25 is provided with a nut 29 and when this nut is tightened on the bolt, the inner race 26 is pressed against the surface 24b of the clamping member 24 so that this member clamps surfaces 24a thereof against the inclined surfaces 17b and 18b of the cutting tips 17 and 18. Thus, the upper inclined surfaces 17a and 18a of these cutting tips are forced against the undercut surface 20 of the part 19 of the sleeve-like shank 18. At the same time, the part 21 of the sleeve-like shank partially encloses the cutting tips or bits 17 and 18 to minimize the likelihood of the tips or bits being thrown out of the holder if they should break.

When the shank 18 of the tool is attached to the chuck 13 of the router 10, the tool may be used for trimming the outer edge of the plastic 15, as shown in FIG. 1. In this operation, the outer race 28 of the ball bearing assembly engages the plywood core 16 and provides a bearing so that the outer edge of the plastic top 15 is cut uniformly.

While I have shown a preferred embodiment of the invention, it will be understood that the invention is capable of variation and modification from the form shown so that its scope should be limited only to the scope of the claim appended hereto.

What I claim is:

In a rotary cutting tool adapted to be attached to a hand held drive unit, the combination comprising a hollow member, one end part of said hollow member forming a shank which is adapted to be gripped by the drive unit, said hollow member having a flange extending therefrom, one side of said flange being adjacent to one end of said shank, the other side of said flange being undercut, the other end part of said hollow member having longitudinally extending recesses, cutting bits positioned in said recesses so that the cutting edges thereof extend radially therefrom, one end of each of said cutting bits engaging the undercut side of said flange, clamping means comprising a washer positioned adjacent said other end part of said hollow member and having an undercut side engaging the other end of each of said cutting bits and means comprising a rod-shaped member positioned in said hollow member clamping said cutting bits between said washer and said flange, and bearing means, said bearing means being clamped by said rod-shaped member against said washer, said bearing means having a rotatable member engaging the work surface to limit the depth of cut taken by said cutting bits in said work surface.

References Cited
UNITED STATES PATENTS

| | | | |
|---|---|---|---|
| 947,079 | 1/1910 | Latchman | 144—231 X |
| 2,188,584 | 1/1940 | Tyne | 144—241 X |
| 3,289,717 | 12/1966 | Dutot | 144—134 |

DONALD R. SCHRAN, *Primary Examiner.*